United States Patent [19]
Kelsall

[11] B 4,003,658
[45] Jan. 18, 1977

[54] TRIANGULAR INTERFEROMETRIC LIGHT-SOURCE TRACKER

[75] Inventor: Dennis Kelsall, Concord, Mass.

[73] Assignee: The United States of America as represented by the Secretary of the Air Force, Washington, D.C.

[22] Filed: July 26, 1974

[21] Appl. No.: 492,093

[44] Published under the second Trial Voluntary Protest Program on March 23, 1976 as document No. B 492,093.

[52] U.S. Cl. .............................. 356/110; 356/113; 356/125; 250/203 R
[51] Int. Cl.² ..................... G01B 9/02; G01D 21/04
[58] Field of Search .......... 356/106, 110, 113, 107, 356/124, 125; 250/203; 318/640

[56] References Cited
OTHER PUBLICATIONS

Hariharan "Cyclic Shearing Interferometer" *Journal of Scientific Instruments,* vol. 37, p. 374.
Tsuruta, "Measurement of Transfer Functions . . . Shearing Interferometer", JOSA vol. 53 No. 10 p. 1156.

*Primary Examiner*—Alfred E. Smith
*Assistant Examiner*—Conrad J. Clark
*Attorney, Agent, or Firm*—Joseph E. Rusz; Julian L. Siegel

[57] ABSTRACT

A system is described for tracking the position of a light source by mounting two orthogonal triangular interferometric systems on a gimbaled platform. The interferometric systems each provide a carrier frequency signal depending upon their pointing angle with respect to the light source. These carrier signal frequencies provide the error signals for the X and Y axis drives of the platform.

5 Claims, 3 Drawing Figures ent of the triangular interferometric light-source tracker.

TRIANGULAR INTERFEROMETRIC LIGHT-SOURCE TRACKER

BACKGROUND OF THE INVENTION

The invention relates to a light-source tracking system and more particularly to a system which uses orthogonal triangular interferometric systems which provide modulation transfer functions containing carrier frequencies which are used to provide the tracking signal.

Prior art light-source tracking systems formed an image of the object being tracked on a detector and sensed the position of image on the detector to provide the tracking signal. The sensing was achieved by using a scanning reticle in conjunction with amplitude sensitive detectors; a position sensitive detector in the form of a solid state device which produces a signal proportional to the location of the incident light on the device, or a television type of device.

SUMMARY OF THE INVENTION

The invention uses the carrier frequencies of the modulation transfer functions obtained from two paths in a triangular interferometer to sense the direction of a light source from the boresight axis of the transfer in the X and Y directions. The invention depends upon the triangular interferometer being responsive to a small change in the angle of a received light beam to produce a corresponding differential path difference between the two beams within the interferometer. The rotating plate of the interferometer converts this path difference, a phase difference, to a corresponding carrier frequency in the modulation transfer function output of the interferometer. A tracker mount holds a receiver telescope, a beam splitter, a dove prism and the triangular interferometer. The received light from the received telescope is split into two beams by the beam splitter, one beam being provided as an input for one path in the interferometer. A dove prism is placed in the other beam path of the interferometer to rotate the light beam through 90° in space to cause that interferometer to provide a signal proportional to the angular error along the X-axis while the other interferometer path provides the error signal for the Y-axis. The tracker mount is gimbal mounted to allow movement of the boresight in the X and Y axes in response to the X and Y error signals from the interferometers.

It is therefore an object of this invention to provide a new type of non-imaging tracker which uses the modulation transfer functions of a light source to provide the tracking signals for control of the boresight axis of the tracker.

It is a further object of the invention to provide a tracker that is insensitive to effects caused by atmospheric variations.

It is a further object of the invention to provide a tracker that is fast in operation.

DETAILED DESCRIPTION OF THE PREFERRED EMBODIMENT

Figure 1:
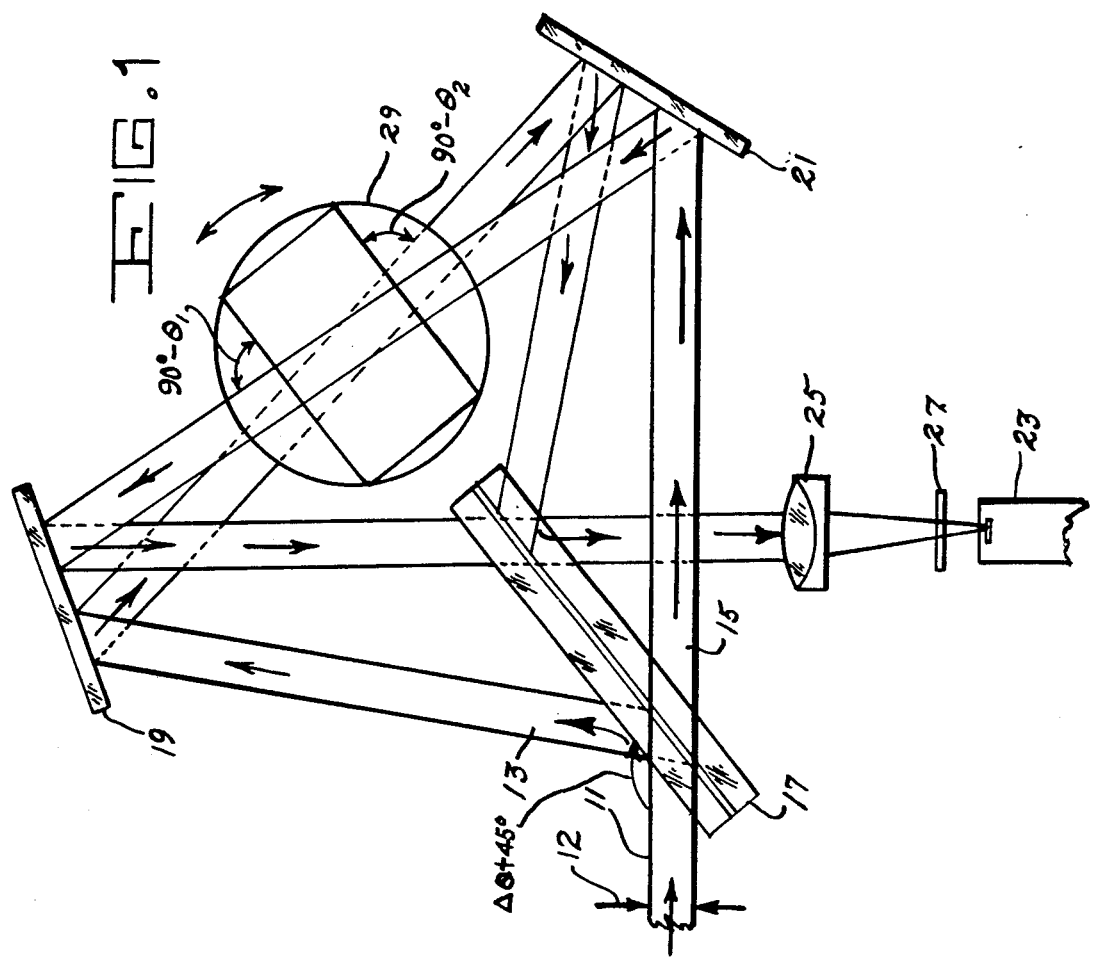
FIG. 1 is an optical schematic diagram showing an embodiment of the triangular interferometer.

Referring to FIG. 1, which shows an optical schematic of the triangular interferometer, an incident collimated beam 11, such as light from a laser transmitted through the atmosphere being investigated, enters through aperture 12. Beam 11 is divided into two parts, 13 and 15, at beam splitter 17 and then each beam 13 and 15 traverses a triangular path in opposite directions striking reflecting surfaces of mirrors 19 and 21 and are recombined and interfere at the beam splitter 17. The light is subsequently directed to a radiation detector or photomultiplier 23 via lens 25 and diffuser 27 which are in optical alignment. Micrometer plate 29 is rotated through an angle $\theta$ through a normal symmetrical position. This both changes the path length each beam traverses through the interferometer and produces equal but opposite amounts of lateral displacement or shear of the two beams. Initially adjust the direction of the input beam which enters the interferometer so that it is incident exactly at 45° to the beam splitter 17, such that the two beams passing through the micrometer plate are exactly parallel and collinear. For each beam, as the micrometer plate is rotated from the normal through an angle $\theta$, the total path change is given by $$\Delta = (\mu - 1)t + \frac{(\mu - 1)t}{2\mu}\theta^2$$

where $\mu$ is the refractive index, $t$ is the plate thicknesss, and $\theta$ is the angle between the normal to the plate and the beam traversing it. Next adjust the direction of the input beam 11 which enters the interferometer so that it is incident at an angle $(45° + \Delta\theta)$ to the beam splitter plate. Now the two beams traversing the micrometer plate are not parallel, but as shown in FIG. 1, each makes a slightly different angle to the normal, $\theta_1$ and $\theta_2$, respectively, then the path change in each case is not equal but depends on the angle $$\Delta\theta = \theta_1 - \theta_2$$

beam 1: $\Delta_1 = (\mu - 1)t + \frac{(\mu - 1)}{2\mu} t\, \theta_1^2$ beam 2: $\Delta_2 = (\mu - 1)t + \frac{(\mu - 1)}{2\mu} t\, \theta_2^2$ Therefore, the relative difference in path length for the two beams is given by $$\Delta = \Delta_1 - \Delta_2 = \frac{(\mu - 1)t}{2\mu}(\theta_1^2 - \theta_2^2)$$

or $$\Delta = \frac{(\mu - 1)t}{2\mu}(\theta_1 + \theta_2)(\theta_1 - \theta_2).$$

If the micrometer plate is rotated continuously and uniformly, the path mismatch in the two beams varies linearly with the angle of rotation since $(\theta_1 - \theta_2)$ is constant. The relative shear (lateral displacement of the two beams) is given by $$s = 2\, \frac{(\mu - 1)t}{\mu}\, \frac{1}{h}(\theta_1 + \theta_2),$$

where $h$ = beam diameter. Therefore, both shear and path differences vary linearly with $(\theta_1 + \theta_2)$. As the micrometer plate is rotated, the output signal (measuring the total light in the interferogram) consists of a constant-frequency carrier signal, whose amplitude is modulated continuously. This output signal traces directly the complete modulation transfer function curve and can be recorded on tape and displayed visually in real time on an oscilloscope.

Figure 2:
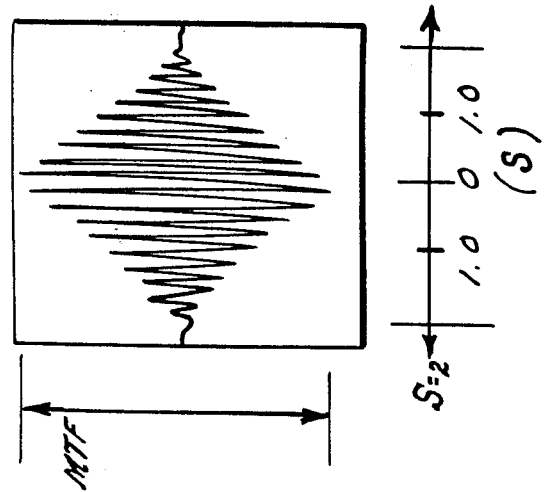
FIG. 2 is a graph of the modulation transfer function plotted against spatial frequency.

The micrometer plate can be continuously rotated by a small motor. The display on the oscilloscope for a 10 MM diffraction-limited circular aperture is shown in FIG. 2. For each rotation of the micrometer plate, the complete modulation transfer function (from $s = 0$ to $s = 2$) is obtained four times. Part of the scanning time must necessarily be dead time. In practice, the parameters are chosen so that a complete modulation transfer function curve is traced as the micrometer plate is rotated through about 20°. Hence, for each rotation, approximately 75 percent of the time is dead time. The display shown in FIG. 2 corresponds very closely to the diffraction-limited curve for a clear aperture, the time scale being about 1 msec for the complete modulation transfer function curve. In the laboratory, rotating the micrometer plate at 3600 rpm, the complete modulation transfer function curve has been measured in roughly 1.25 msec. The carrier signal in this case was somewhere between 10 kHz and 100 kHz. (This depends on $\theta_1 - \theta_2$).

This new method and system is well-suited to extension to infrared measurements up to 10 microns, if the micrometer plate and the beam splitter are chosen to be of a suitable material for this wavelength region, and an infrared detector used. In this case, because of the longer wavelengths and other parameters, the maximum useful scan rate may be somewhat less than that in the visible version of this interferometer.

Nevertheless, the data gathering capability of this new technique exceeds any other known modulation transfer function measuring system and is amendable to relatively simple digitization and computer processing operations. The triangular interferometer can be ruggedized and capable of operating from any airborne platform. Because of the less complicated optical components, it is more compact than the previous systems and does not require any internal adjustments during use.

The phase transfer function can be measured from the output signal from the interferometer, by monitoring the instantaneous frequency at each position on the spatial frequency axis (or more exactly the phase of each cycle of the electrical signal is a measure of the phase transfer function at each shear point on the MTF scale.)

If the overall angle of arrival of the incident beam changes (measured by $\Delta \theta$), then the overall frequency of the carrier signal of the output signal changes correspondingly. Thus a measurement of this carrier signal frequency allows a measurement of the angle of arrival of the wavefront in the incident beam.

The apparatus may also be used with a white light source, (or other non-laser source) providing certain coherence limitations are satisfied, (such as by using a narrow band spectral filter, and keeping the source size small).

Figure 3:
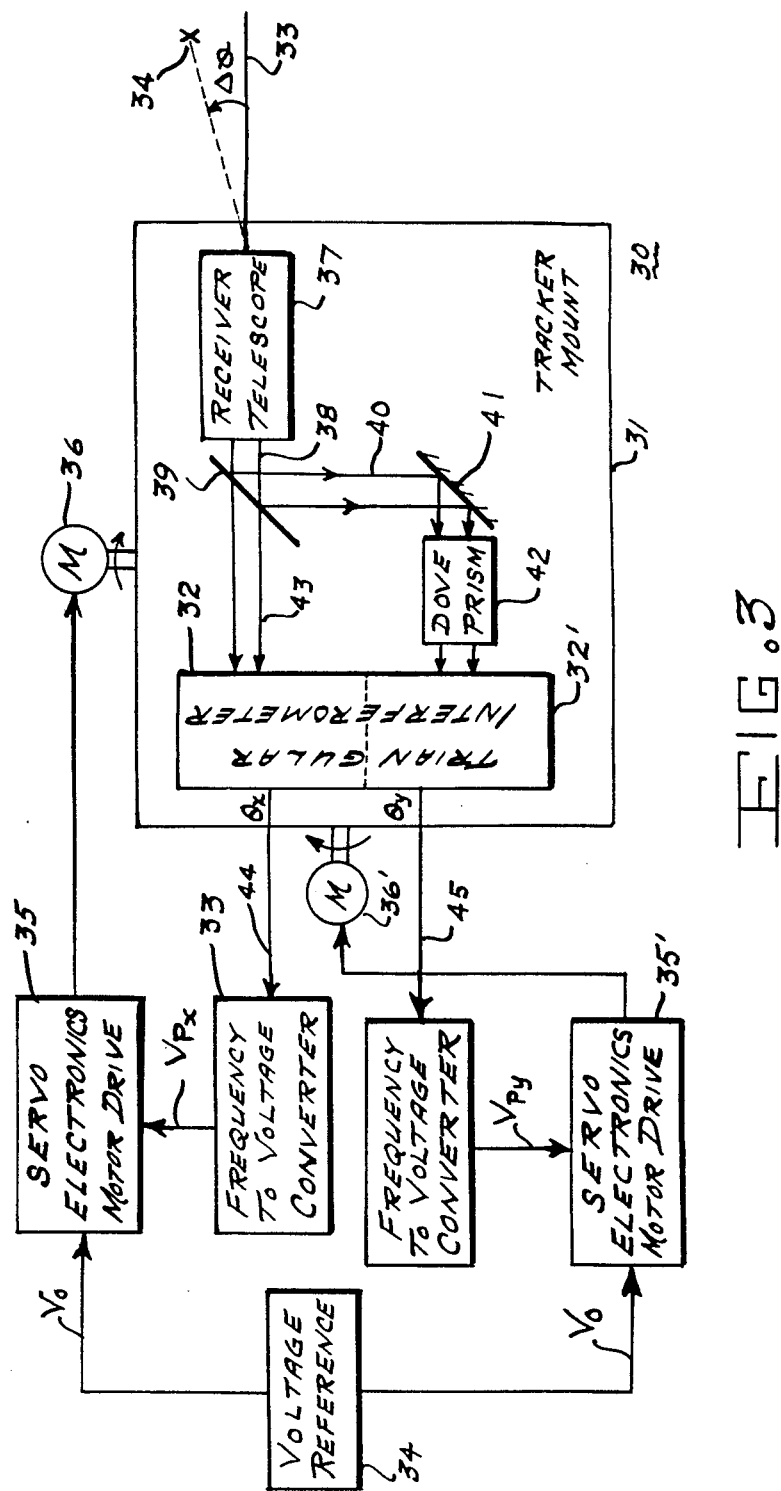
FIG. 3 is a schematic diagram showing an embodiment of the triangular interferometric light-source tracker.

The MTF scanning interferometer of FIG. 1 can be applied as a non-imaging tracker to allow an accurate method of pointing, as for example in the gimballed-mounted interferometric tracker 30 of FIG. 3.

The signal produced by the operation of the scanning interferometer 32 has a carrier signal frequency, $f$, which depends on the pointing angle $\Delta \theta$ where $$f = \frac{d\Delta}{d\gamma} \quad \frac{\mu - 1}{\mu} \, t \, \Delta\theta \, \frac{d\theta}{d\gamma}$$

where $d\Delta/d\tau$ is the rate of change of relative path difference with time, $\mu$ is the refractive index, $t$ is the micrometer plate thickness, $\theta_1$ and $\theta_2$ the respective angles the two beams traversing the interferometer make with the normal to the micrometer plate, and $\Delta\theta$ is the pointing angle.

In principle a tracker can be made by sensing the carrier frequency $f$, and producing a voltage signal proportional to $f$. The voltage signal is then amplified by electronic means and used to operate a servo motor or similar means to change the pointing direction of the interferometer. As the pointing direction is changed, the carrier signal frequency (which is proportional to $\Delta\theta$) is correspondingly changed. The system can be arranged so that the pointing angle is progressively changed until the voltage signal is reduced to zero. At this point, the system is accurately boresighted on the source.

In summary, the operation of the servo loop, which changes the tracking angle, is to maintain the carrier signal frequency sensed at the output of the interferometer at zero. The signal frequency modulation is continually monitored to generate an error signal and the frequency modulation reduced to zero by pointing the gimballed mount on which the interferometer is installed accurately at the source.

In order to overcome the ambiguity inherent in which direction the servo system must drive the gimballed tracker mount, depending on whether the angular error in pointing is positive or negative, an additional sign sensing signal or means will be necessary. This is because the frequency modulation depends only on the magnitude of the pointing error $\Delta\theta$, and not on the sign (whether positive or negative).

There are two means by which this ambiguity can be either sensed or overcome. The first which is particularly sensitive near to zero pointing error, is to sense the phase of the carrier signal, since this changes by $\pi$ as the pointing angle passes through zero. An easier and more direct means to overcome this ambiguity is to offset the pointing axis of the interferometer in that the 'on track' position corresponds to some fixed frequency of the carrier signal, $f_p$.

In this latter case, when the tracker is accurately pointed on the target, the light beam enters the interferometer at angle $\Delta\theta_p$. The corresponding carrier signal generated, $f_p$, thus is arranged to generate a corresponding voltage, $V_p$, in the electronic circuit 33, which converts frequency to a corresponding voltage. An offset highly regulated constant voltage $V_o$ from voltage reference 34 is matched to $V_p$, such that $(V_p - V_o)$ is used to generate the error signal to operate the tracker servo electronic drive 35. As the tracker reaches the 'on track' pointing direction, the error voltage $(V_p - V_o) = 0$. In this case, the carrier signal $f_p$ from the interferometer is not zero and can be chosen (preselected) by an appropriate choice of $V_o$. If the pointing angle is changed from $\Delta\theta_p$, the carrier frequency will change either higher or lower, depending on the sign of the angular change in pointing. The corresponding error signal ($V_p - V_o$) therefore will be positive or negative according to the direction of the pointing angular error. Thus the servo electronic system 35 can sense which direction to drive the servo motor 36, which moves the gimballed mount 31 to restore the pointing angle to the 'on track' position.

It is understood that in all the above discussion, the operation of the tracking technique has been restricted to one dimension along say one orothogonal axis, the x-axis. For a complete tracking system, a similar identical system must be used along a mutually perpendicular axis, the y-axis. In this case, it is possible to combine the two interferometers into one single-double beam instrument, having two completely independent channels. The two channels are derived from a single receiving telescope 37. The collimated beam 38 from the receiving-tracking-telescope is first divided at a beam splitter 39 by amplitude division, into two equal beams. One of these beams 40 is reflected from a mirror 41 and then passed through a wavefront rotating prism such as a dove prism 42, to rotate it about the optical axis, through 90°. Beams 40, 43 are non-overlapping and displaced from one another in a direction transverse to the plane of the interferometer of FIG. 1. Each beam is passed separately into the triangular interferometer to form a two-channel interferometer, shown for purposes of clarity as two interferometers 32, 32' of FIG. 3, and each channel is independently detected by separate detectors and coupled through channels 44, 45 to its own electronic circuits 33, 33', servo system electronics 35, and the corresponding motor drive 36 on the gimballed tracker 31 for x-axis and y-axis tracking, respectively.

It is understood that with both active laser illumination, and passive self-emission of the target which is being tracked, the interferometric tracker can be designed to operate efficiently, providing suitable spectral filters are used.

The advantage of this technique is that the instabilities and turbulences of the atmospheric optical path, through which the target must be viewed, will not appreciably effect the tracking ability of this non-imaging tracking technique to operate properly. The angular resolution of the non-imaging tracker is therefore much better than the imaging resolution obtained through the normal atmosphere, since the frequency modulation of the signal is not changed by the degradation of the atmosphere. However, the amplitude of the signal will be reduced by atmospheric degradation, and in this respect, it is possible that the ultimate sensitivity of the tracker will be limited by the atmospheric degradation.

What is claimed is:

1. A triangular interferometric tracker of a source light comprising:
    a. a gimballed platform;
    b. an X-axis and a Y-axis rotational drive means for said platform;
    c. means for providing a collimated beam from the light of said source;
    d. means for splitting said beam to provide two beams;
    e. means for rotating the wavefront of one of the two beams through ninety degrees in space;
    f. a triangular interferometer mounted on said gimballed platform with the rotated and non-rotated beams being physically separated beam inputs thereto and with said interferometer producing two separate electrical output signals, said signals being the modulation transfer function of each of the beam inputs; and
    g. means for producing signals from said two output signals suitable to actuate the X-axis and the Y-axis drive means to move said gimballed platform to cause said collimating means to track said source of light.

2. The apparatus of claim 1 wherein said interferometer comprises:
    a. a beam splitter in the path of the collimated light and dividing the light into first and second beams;
    b. a first reflecting surface in the path of the first beam;
    c. a second reflecting surface in the path of the second beam, the first and second reflecting surfaces being positioned to cause the beams to intersect, and to converge at the beam splitter to form a single recombined beam;
    d. means positioned at the intersection of said beams for changing the path length and the shear of the first and second beams; and
    e. a first and second means for detecting the recombined beams of the rotated and non-rotated spatially separated input beams.

3. An interferometric measuring system according to claim 2 wherein the path lengthening means is a continuously and uniformly rotating micrometer plate.

4. An interferometric measuring system according to claim 3 wherein the first and second detecting means each comprise:
    a. a lens in optical alignment with the single combined beam;
    b. a diffuser in optical alignment with the lens; and
    c. a photomultiplier positioned to receive light from the diffuser.

5. A method for tracking a light-source comprising:
mounting an interferometer on a gimballed platform,
producing a collimated beam from the light-source,
splitting said collimated beam to provide two physically separated beams,
rotating the wavefront of one of said beams through ninety degrees in space,
applying the rotated and non-rotated beams as separate inputs to the interferometer,
obtaining two separate modulation transfer function output signals from the interferometer,
applying these output signals to the drive mechanism of the gimballed platform to move said platform to track said light-source.

* * * * *